United States Patent [19]

Mounteer et al.

[11] 4,043,197
[45] Aug. 23, 1977

[54] FLOW RATE TRANSDUCER

[75] Inventors: Carl A. Mounteer; Anthony T. Sizgorich, both of Irvine, Calif.

[73] Assignee: Gulton Industries, Inc., Metuchen, N.J.

[21] Appl. No.: 740,934

[22] Filed: Nov. 4, 1976

[51] Int. Cl.² .......................... G01F 1/38; G01L 7/04
[52] U.S. Cl. .................................. 73/205 R; 73/211; 73/213; 73/412; 73/418
[58] Field of Search ................ 73/205 R, 205 D, 211, 73/213, 412, 418

[56] References Cited

U.S. PATENT DOCUMENTS

| 1,340,198 | 5/1920 | Wilkinson | 73/412 |
| 3,173,003 | 3/1963 | Muller-Girad | 73/205 X |
| 3,296,868 | 1/1967 | Koppel et al. | 73/205 |
| 3,364,750 | 1/1968 | Fishwood | 73/412 |

Primary Examiner—Herbert Goldstein

[57] ABSTRACT

A rate of fluid flow measuring device utilizing a pair of helical Bourdon tubes to generate output signals, from two linear variable differential transformers, which are functions of fluid pressure and flow velocity. A thermocouple generates an output signal which is a function of the temperature of the fluid if a compressible fluid is to be measured. These pressure and temperature output signals are applied to computation means, programmed to solve a modified flow equation, as the variables in the equation, thereby generating an output signal which is a function of flow rate. The helical Bourdon tubes have inlet pressures applied to both ends thereof and are sealed at their centers, the seals being connected to the cores of the linear variable differential transformers to control the transformer output in accordance with the pressure drops across the seals.

4 Claims, 6 Drawing Figures

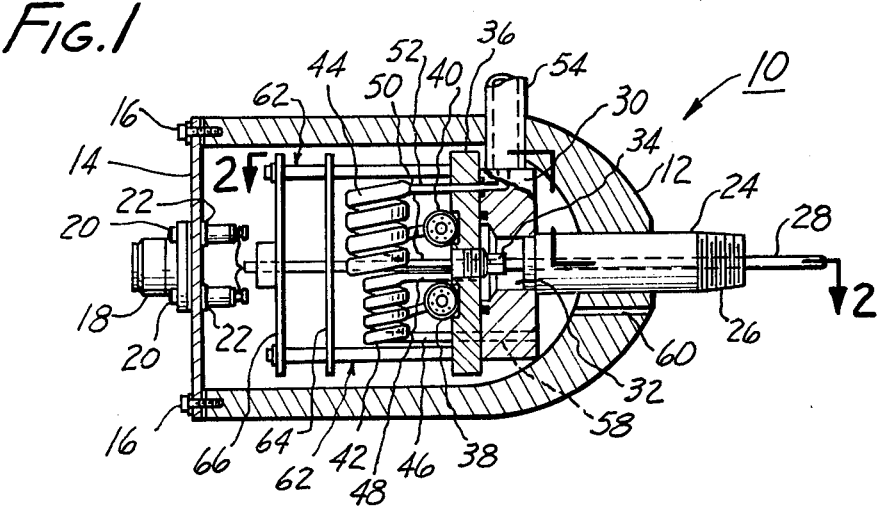
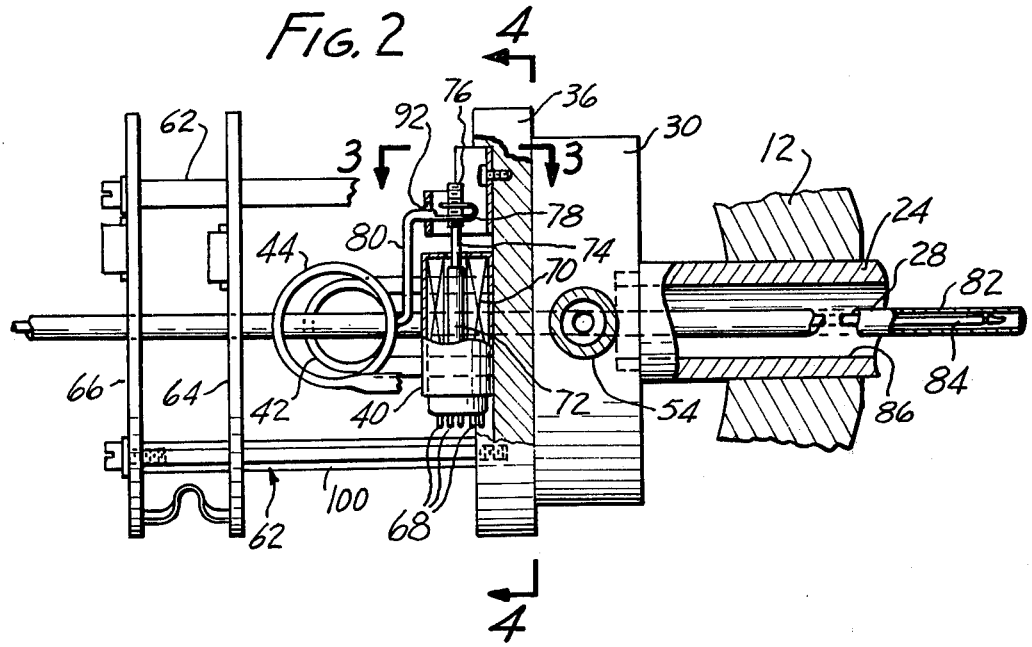
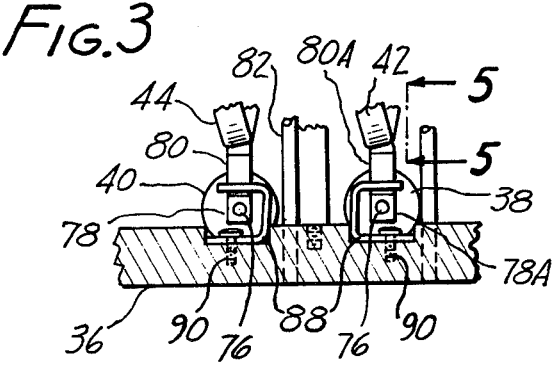
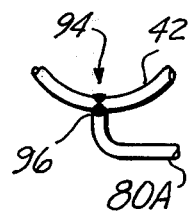

FLOW RATE TRANSDUCER

BACKGROUND OF THE INVENTION

1. Field of the Invention

This invention relates to integrated devices for generating an output signal which is a function of flow rate of a fluid.

2. Description of the Prior Art

Various devices have been used heretofore to measure the flow in conduits of fluids, such as the flow of hydrocarbon liquids or gases in pipelines. However, such devices as have been used heretofore have either been quite bulky and expensive, requiring substantial monitoring and power supplies, or have not provided accurate monitoring of flow rate. Consequently, although such prior devices are of necessity in widespread use, they are, generally speaking, either expensive or inaccurate.

Linear variable differential transformers are well known and are shown, for example, in U.S. Pat. No. 3,600,669 and U.S. Pat. No. 3,848,180. Various physical embodiments of such transformers may be utilized, and various electronic circuits utilized to excite such transformers, as is shown in the aforementioned patents.

Bourdon tubes are also well known in the art. Helical type Bourdon tubes are described in U.S. Pat. No. 3,013,233, in which there is shown a pair of helical Bourdon tubes utilized to measure pressure differential. In U.S. Pat. No. 3,296,868, there is shown a device which utilizes a pair of Bourdon tubes in conjunction with a differential transformer in order to generate a signal which is a function of the pressure differential between the inlet pressures applied to the two Bourdon tubes.

SUMMARY OF THE INVENTION

According to the present invention, a device for flow rate measurement includes first and second pressure differential sensors, each comprised by a helically configured Bourdon tube having a pressure inlet at each end thereof and a seal in the tube disposed equidistant from the inlets so as to divide the tube into two separate pressure sensing portions. Each pressure differential sensor has a linear variable differential transformer associated therewith, the transformers each including a transformer core, a transformer input circuit and a transformer output circuit. The Bourdon tube seal in each of the pressure differential sensors is connected to the transformer core of the linear variable differential transformer associated with the sensor so that movement of the seal moves the transformer core. Means are provided to excite the linear variable differential transformer input circuits, so that transformer core movement produces an output signal in the transformer output circuits. Means are provided to apply fluid pressures to the inlets of the Bourdon tubes in order to produce a pressure differential across one of the Bourdon tube seals corresponding to the pressure of the flow of the fluid and a pressure differential across the other Bourdon tube seal corresponding to the pressure drop at a flow rate measuring device such as a venturi or an orifice. These pressure drops cause movement of the seals, which movements are translated to the transformer cores so as to produce output signals in the transformer output circuits which are functions of the pressure drops across the seals. For compressible fluids, a temperature sensing device, such as a thermocouple, is utilized to generate a signal which is a function of the temperature of the fluid. The pressure and temperature signals are mathematically combined in a modified flow equation in order to generate a signal which is a function of the flow rate being monitored.

BRIEF DESCRIPTION OF THE DRAWING

The invention may be more readily understood by referring to the accompanying drawing, in which:

FIG. 1 is a side elevation, partially in section, of the flow rate transducer of the present invention;

FIG. 2 is a side elevation, partially broken away, taken along lines 2—2 of FIG. 1;

FIG. 3 is a partial side elevation taken along lines 3—3 of FIG. 2;

FIG. 5 is a partial side elevation taken along lines 5—5 of FIG. 3; and

DESCRIPTION OF THE PREFERRED EMBODIMENT

Figure 6:
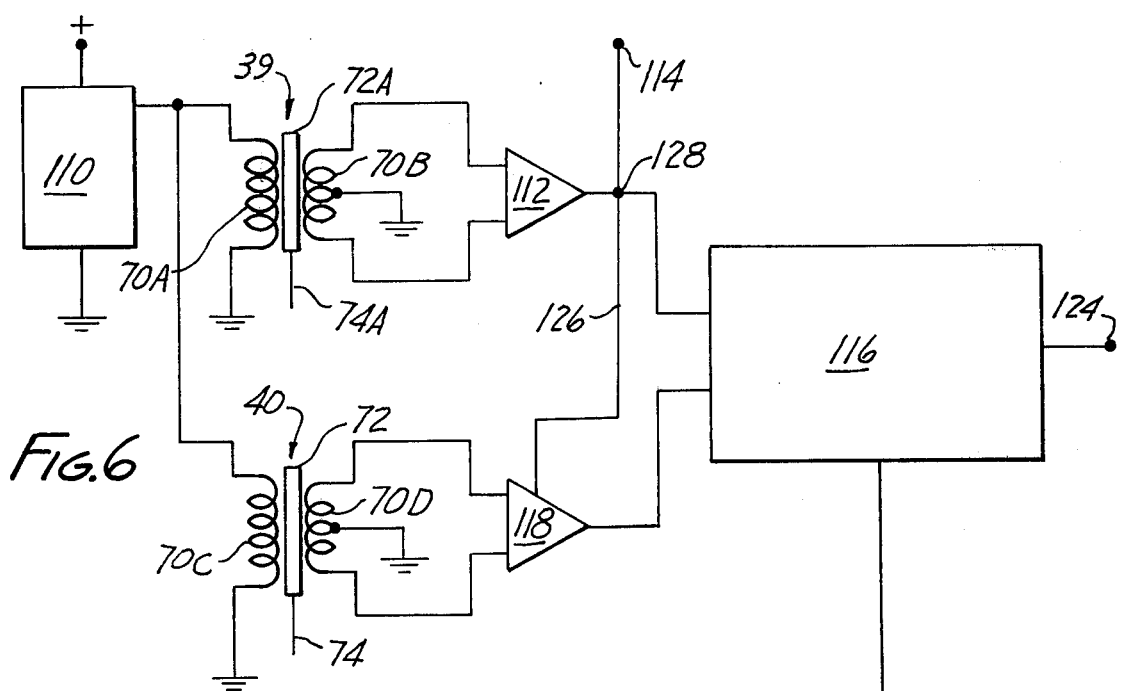
FIG. 6 is a block diagram of the computation circuitry for use with the present invention.

Referring now to FIG. 1, there is shown, partially in section, a flow rate transducer 10 according to the present invention. The transducer 10 has an outer shell 12 which may be of any appropriate metal, steel for example, and which is closed at one end by an end plate 14 by means of bolts 16. The plate 14 has an electrical connector 18 attached thereto by bolts 20 which engage nuts 22 disposed on the opposite side of the end plate 14 from the connector 18. The connector 18 is utilized to supply electric energization to the transducer 10 and to transmit the output signals from the transducer 10 to a remote location where the output signals may be converted to visual or other representation of the flow rate and other variables determined by the transducer.

At the opposite end of the transducer 12 from the end plate 14 is an attaching probe 24, which has a threaded end 26 utilized to attach the transducer 10 to a section of pipe or other conduit within which the fluid is flowing. Thus, the thread 26 may be conventional pipe thread, for example. Extending out of the attaching probe 24 so as to extend into the pipe is a thermocouple member 28, showing greater detail in FIG. 2, which may include a conventional bimetallic thermocouple for generating an electrical signal which is a function of temperature. The attaching probe 24 terminates within the transducer 10 at a base plate 30 in a hollow central portion 32 thereof. The attaching probe 24 is hollow (see FIG. 2) so that the pressure within the pipe, into which the threaded portion 26 is threaded, is communicated through the attaching probe 24 to the base plate hollow central portion 32.

Thermocouple member 28 extends through the hollow central portion 32 and terminates in a support seal 34 contained in a central aperture formed in a component support member 36. Attached to the component support member 36 are a first linear variable differential transformer 38 and a second linear variable differential transformer 40. Also connected to the component support member 36 are a first helical Bourdon tube 42 and a second helical Bourdon tube 44. The first helical Bourdon tube has a first inlet portion 46 and a second inlet portion 48. The second helical Bourdon tube 44 has a first inlet portion 50 and a second inlet portion 52. The first and second inlet portions are attached to the component support member 36 so as to support the helical Bourdon tubes 42, 44 in the transducer 10. Each of the helical Bourdon tubes 42, 44 has a seal (not shown, see FIG. 5) which seals the tube at a point equidistant from the tube inlet portions.

A downstream pressure inlet pipe 54 extends through the shell 12 adjacent to and seals with the base plate 30. The downstream pressure inlet pipe 54 is hollow, and is utilized to communicate the lower pressure existing on the downstream side of a flow velocity measuring device, such as an orifice or a venturi, to the base plate 30. The base plate 30 has a downstream pressure inlet passage 56 formed therein so as to communicate the pressure in the pipe 54 to the second Bourdon tube second pressure inlet 52. The second Bourdon tube first inlet portion 50 communicates through the component support member 36 so as to open into the base plate hollow central portion 32, and thereby communicate the pressure of the fluid, upstream of the orifice or venturi, to the second Bourdon tube first inlet portion 50. Similarly, the upstream pressure is communicated to the first Bourdon tube second inlet portion 48, as is more clearly shown in FIG. 4. The first Bourdon tube first inlet portion 46 communicates through the component support member 36 to an ambient pressure inlet passage 58 formed in the base plate 30 so as to open into the space within the shell 12. A shell ambient pressure inlet passage 60 is formed in the shell adjacent the attaching probe 24 so as to permit the interior of the shell to remain at ambient pressure. Thus, the ambient pressure is communicated through the shell inlet passage 60 and the base plate inlet passage 58 to the first Bourdon tube first inlet portion 46.

Also attached to the component support member 36 are three standoff pin assemblies 62, only two of which are shown in FIG. 1. These standoff pin assemblies 62 support a first printed circuit component board 64 and a second printed circuit component board 66 within the shell. The printed circuit component boards 64, 66 contain the circuitry and electronic components referred to with respect to FIG. 6 and are utilized to compute the pressure, temperature, and flow rate utilizing the pressure differential signal and temperature signal generated by the Bourdon tubes and thermocouple, respectively.

Referring now to FIG. 2, there is shown a side elevation, partially in section, taken along lines 2—2 of FIG. 1. As is seen in FIG. 2, the second linear variable differential transformer 40 includes outlet terminals 68. Electrical wiring, not shown, is connected between the outlet terminals 68 and the printed circuit boards 64, 66 in order to complete the electrical circuitry for the device. The second linear variable differential transformer 40 has primary and secondary windings, shown schematically as 70, and a transformer core 72. The transformer core 72 terminates in a core arm 74 which has a threaded portion 76 rotatably fastened to a U-shaped termination 78 of a second Bourdon tube arm 80. The second Bourdon tube arm 80 is attached to the second Bourdon tube 44 at the seal (not shown, see FIG. 5) so that movement, either clockwise or counterclockwise, of the seal in response to a pressure differential across the seal is translated through the arm into motion of the transformer core 72, thereby changing the output of the linear variable differential transformer. The first linear variable differential transformer 38 is similarly associated with and connected to the first Bourdon tube 42 through a similar arm 80A.

As is also shown in FIG. 2, the thermocouple member 28 consists of a hollow outer shell 82 with an active thermocouple element 84 disposed therewithin. The outer shell 82 serves to protect the thermocouple element from damage and to provide the necessary rigidity for injection of the thermocouple element into the flow of fluid to be measured. As is also seen in FIG. 2, the attaching probe 24 has a central passage 86 extending therethrough, utilized to communicate the pressure of the flowing fluid to the first transducer second inlet portion 48 and the second transducer first inlet portion 50, as described heretofore.

Referring now to FIG. 3, there is shown a partial side elevational view taken along lines 3—3 of FIG. 2. Associated with each of the transformers 38, 40 is a movement limiting shield 88 attached to the component support member 36 by a bolt 90. The limiting shields 88 each have an aperture 92 (not shown, see FIG. 2) formed therein, through which pass the Bourdon tube arms 80, 80A. The shields 88, with apertures 92, protect the attachment of the arms 80, 80A to the transformer core arm threaded portions 76, and limit the movement of the transformer core 72. The attachment of the Bourdon tube arms 80, 80A to the respective Bourdon tubes 44, 42 is shown in detail in FIG. 5, which is a partial sectional view taken along lines 5—5 of FIG. 3 illustrating the attachment of the first Bourdon tube 42 to its arm 80A. In FIG. 5, the Bourdon tube 42 has a seal 94 formed by a crimp positioned equidistant between the inlets at either end of the Bourdon tube, so as to divide the Bourdon tube into two separate portions which are sealed one from the other. The arm 80A is attached to the Bourdon tube 42 at the crimp 94 by a weld 96.

Figure 4:
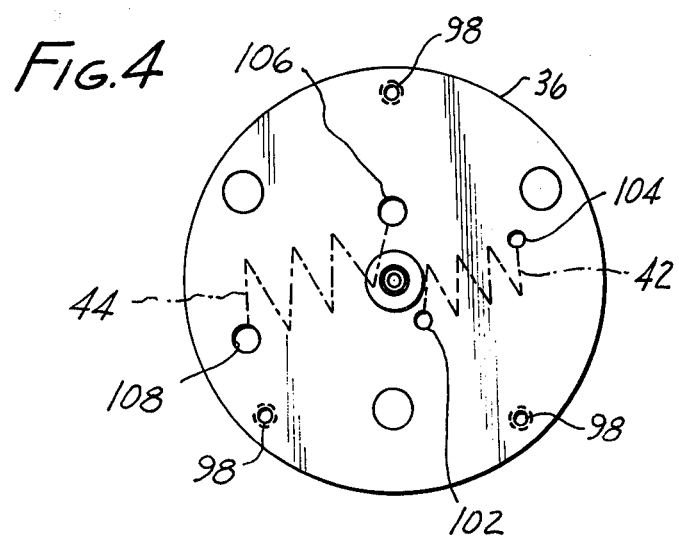
FIG. 4 is a plan view taken along lines 4—4 of FIG. 2.

Referring now to FIG. 4, there is shown a plan view taken along lines 4—4 of FIG. 2 illustrating the inlet passages formed in the component support member 36. The first Bourdon tube 42 and second Bourdon tube 44 are shown by dotted lines in FIG. 4 to better illustrate the relative disposition of the components. The support member 36 also has three threaded recesses 98 which receive and engage standoff pin assembly bolts 100 (not shown, see FIG. 2) to attach the standoff assemblies 62 and thus the printed circuit component boards 64, 66 to the component support member 36. The component support member 36 has four pressure inlet passages 102, 104, 106, 108 extending therethrough. The passage 102 and the passage 106 open into the hollow central portion 32 of the base plate 30 (see FIG. 1) and are referred to hereinafter as the first and second Bourdon tube first inlets 102, 106, respectively. The passage 104 opens into the downstream pressure inlet passage 56 in the base plate 30 and is referred to hereinafter as the first Bourdon tube second inlet 104. The passage 108 opens into the ambient pressure inlet passage 58 in the base plate 30 and is referred to hereinafter as the second Bourdon tube second inlet 108.

Referring now to FIG. 6, there is shown, in schematic form, a block diagram of the computation circuitry for use with the present invention. The components making up the computation circuitry are all well known commercially available components, and the specific use of a special component forms no inventive part of the present invention. In FIG. 6, the first linear variable differential transformer 38 has a primary winding 70A, a split secondary winding 70B which is connected with its center tap to ground, and the second linear variable differential transformer 40 has a primary winding 70C and a split secondary winding 70D with its center tap connected to ground. As oscillator 110 connected between a source of positive potential and ground is utilized to apply excitation to the primary winding 70A, 70 of the linear variable differential transformers 38, 40. The output of the first linear variable differential transformer secondary windings 70B is applied to a differential amplifier circuit 112, whose output is a function of the flow pressure and may be measured directly at a terminal 114. In addition, this output signal is applied as one input to a flow volume computation circuit 116. The output of the second linear variable differential transformer secondary winding 70D is applied to a differential amplifier computation circuit 118, whose output is a signal which is a function of the pressure drop across the flow measuring device, such as a venturi or an orifice, utilized in the conduit to generate a pressure drop in order that flow may be measured. This output signal is also applied to the amplifier 116. The output of the thermocouple 84 is applied to a differential amplifier 120 to provide an output which corresponds to the absolute temperature of the fluid whose flow is to be measured. This output signal is applied to the differential amplifier 116 and is available as an output signal to be read directly at a terminal 122.

The differential amplifier 116 is a computation amplifier which is programmed, for example, by use of a hybrid multifunction converter such as model No. 4302 of Burr-Brown, Inc., of Tucson, Arizona, to provide an output signal at a terminal 124 which corresponds to the flow rate in the conduit to be measured. For incompressible fluids, the thermocouple 84 and its resultant temperature input need not be used, as the compressibility of the fluid is assumed constant. However, for compressible fluids, the temperature at which the fluid is flowing should be taken into account, and so a modified flow equation, including a temperature variable, is utilized.

For incompressible fluids, such as liquids at any temperature, or for fluids which, although compressible, are to be measured without regard to flow rate variation due to temperature, the general flow equation may be modified to provide a volume flow measurement in accordance with the following equation:

$$Q_i = K_1[\Delta P]^{1/2}$$

where $Q_i$ is flow rate by volume or weight, $\Delta P$ is the pressure differential across the second sensor seal, and $K_1$ is a constant for the device whose value is selected so as to give flow rate by volume or weight, as desired.

For compressible fluids, however, where temperature variation is to be monitored in order to provide an exact measurement of flow rate, the generalized flow equation may be modified to provide a flow rate in accordance with the following:

$$Q_c = K_2[0.3P_1\Delta P - 0.32(\Delta P)^2)/T_1]^{1/2}$$

where $Q_c$ is flow rate by volume or weight, $P_1$ is the pressure differential across the first sensor seal, $\Delta P$ is the pressure differential across the second sensor seal, $T_1$ is the absolute temperature of the fluid, and $K_2$ is a constant for the device whose value is selected so as to give flow rate by volume or weight, as desired.

The operation of the device of the present invention will now be describd. As has been mentioned heretofore, the present invention is utilized in conjunction with conventional flow rate measuring devices such as orifices and venturis. The device of the present invention is located, if attached directly to the conduit so as to provide direct temperature measurement, upstream from the orifice or venturi. The pressure in the conduit at the point of attachment of the device to the conduit is applied to the first and second Bourdon tube pressure sensors through the central passage 86 in the attaching probe 24, which communicates with the hollow central portion 32 of the base plate 30 and therefore communicates the pressure directly to the first inlets 102, 106 of the first and second Bourdon tubes, respectively. The downstream reduced pressure generated at the orifice or venturi is communicated through the downstream pressure inlet pipe 54 and the downstream pressure inlet passage 56 in the base plate 30 to the first Bourdon tube second inlet passage 104. The ambient pressure at the point of attachment of the device to the conduit is communicated through the shell inlet passage 60 and the ambient pressure inlet passage 58 to the second Bourdon tube second inlet passage 108. The pressure differential across the second pressure sensor seal will, therefore, represent the pressure at which the fluid is flowing. If absolute pressure, rather than gauge pressure, is to be measured, rather than communicating with the ambient pressure, the portion of the second Bourdon tube which communicates with the second inlet passage 108 can be evacuated and sealed. Thereby, absolute, rather than gauge, pressure exists across the second Bourdon tube seal. The first Bourdon tube seal separates the pressure at which the fluid flows from the reduced pressure produced by the flow measuring device. Therefore, the pressure differential across the first Bourdon tube seal will indicate pressure drop through the flow measuring device, as is conventionally used to determine flow rate.

The pressure differentials at the two Bourdon tube seals are translated into rotational movement of the seals, either clockwise or counterclockwise, in accordance with the magnitude and sense of the differential. This rotational movement is transmitted by the arms 80, 80A to the linear variable differential transformers 40, 38, and, specifically, to their respective cores 72A, 72. The movement of the transformer cores 72A, 72 unbalances the transformers, thereby producing output signals in the second winding 70B, 70D whose magnitude and sense are functions of the pressure differentials across the respective seals. These output signals are applied to the differential amplifiers 112, 118 to produce the inputs required for the computation circuit 116. The thermocouple 84 produces a signal which the differential amplifier 120 process to produce a signal which is a function of absolute temperature as required for the modified flow equation if temperature is to be considered. This absolute temperature signal is applied to the terminal 122 as a temperature output signal and is applied to the computation circuit 116. An output signal is generated by the computation circuit 116 and applied to the terminal 124 as representing the mass flow rate or volume flow rate, as appropriate, of the fluid in the conduit being measured.

In embodiments in which the flow rate is determined by the equation $Q_i = K_1[\Delta P]^{1/2}$, the computation of $P_1$, the pressure of the flow, is not required for determination of flow rate. However, in such devices, a small difference in the cross-sectional area of the two portions of the Bourdon tube utilized to determine $\Delta P$ will produce an erroneous $\Delta P$ signal due to this structural dissimilarity. As a practical matter, it is almost impossible to fabricate a Bourdon tube, on an economical basis, which does not have such a structural variation. However, this error can be compensated for by utilizing the $P_1$ signal otherwise available in the preferred embodiment as a feedback signal. Thus, in FIG. 6, a feedback lead 126 applies a feedback signal from a junction 128, at which the $P_1$ signal exists, to the $\Delta P$ computation differential amplifier 118. The proportional magnitude of the feedback signal is selected by any conventional means, such as a resistor, to provide compensation for the cross-sectional differences in the Bourdon tube 40 utilized to generate the $\Delta P$ signal. In embodiments where this correction is not desired and the generation of the $P_1$ signal is not desired, the first sensor and associated circuitry can be eliminated, so that the $Q_i = K[\Delta P]^{1/2}$ equation is utilized without correction.

The present invention provides a pressure transducer with significant economic advantages over devices of the prior art capable of providing comparable monitoring. The use of the Bourdon tube, as contrasted to other types of pressure sensors, provides a relatively inexpensive device for measuring small pressure differentials in a "wet-wet" system, that is, a liquid pressure differential. The use of the Bourdon tube which is constrained at both ends, with the intermediate crimp seal, rather than constraining only one end, as is shown in U.S. Pat. No. 3,013,233, reduces tube stress to one-fourth the stress exhibited in an unconstrained tube, due to the large reduction in bending stress. Thus, the transducer of the present invention will operate at four times the maximum range of an unconstrained Bourdon tube. The linear variable differential transformer provides a very sensitive detector for movement of the Bourdon tube, thereby enabling the transducer of the present invention to detect and measure quantitatively very small changes in pressure at a high line pressure in a wet-wet system, at a cost significantly less than comparable devices heretofore available.

The invention claimed is:

1. In a transducer for measuring the flow rate of a fluid, the combination of
    first and second pressure differential sensors, said pressure sensors each comprised by a helically configured Bourdon tube having a pressure inlet at each end thereof and a seal in the tube disposed equidistant from said inlets and dividing each tube into two separate pressure sensing portions;
    first and second linear variable differential transformers respectively associated with the first and second pressure sensors, said first and second linear variable differential transformers each including a transformer core, a transformer input circuit and a transformer output circuit;
    means for connecting each pressure sensor at the seal to the core of its respective transformer so that movement of the seal moves the core of the respective transformer;
    first fluid pressure inlet means;
    means for connecting said first fluid pressure inlet means to one pressure inlet of each of said pressure sensors for communicating the pressure at said first fluid inlet means to said sensors;
    second fluid pressure inlet means for receiving a reference pressure;
    means for connecting said second pressure inlet means to the other pressure inlet of the first pressure sensor to communicate the pressure of said second fluid pressure inlet means to said other first sensor pressure inlet, whereby the position of the first sensor transformer core is a function of the pressure differential across the first sensor seal representing the pressure of which the fluid is flowing;
    third fluid pressure inlet means for receiving a reduced pressure from a flow measuring device of the class comprised by orfices and venturis through which the flow to be measured flows;
    means for connecting said third pressure inlet means to the other pressure inlet of the second pressure transducer to communicate the pressure of said third pressure inlet means to said other second sensor pressure inlet, whereby the position of the second sensor transformer core is a function of the pressure differential across the second sensor seal representing the pressure drop generated by the flow measuring device;
    transformer actuation means operable to energize the first and second transformer input circuits to produce first and second transformer output signals in the respective first and second transformer output circuits, said output signals being functions of the positions of the respective cores and therefore of the pressure differentials across the first and second seals;
    computation means operable in response to the output signals from the first and second transformer output circuits to compute flow rate; and
    means for applying the signals from the first and second transformer output circuits to the computation means.

2. The combination of claim 1 and including temperature sensing means operable to produce an output signal which is a function of the absolute temperature of the fluid whose flow rate is to be measured; and
    means for applying the temperature sensing means output signal to the computation means,
    and in which the computation means computes flow rate based upon the equation:

$$Q_c = K_2[(0.3P_1\Delta P - 0.32(\Delta P)^2)/T_1]^{1/2}$$

where
    $Q_c$ is flow rate by weight or volume,
    $P_1$ is the pressure differential across the first sensor seal,
    $\Delta P$ is the pressure differential across the second sensor seal,
    $T_1$ is the absolute temperature of the fluid, and
    $K_2$ is a constant for the device.

3. The combination of claim 1, and in which the flow rate computation is based upon the equation:

$$Q_i = K_1[\Delta P]^{1/2}$$

when
    $Q_i$ is flow rate by weight or volume,
    $\Delta P$ is the pressure differential across the second sensor seal, and
    $K_1$ is a constant for the device;

and in which a signal which is a function of the pressure differential across the first sensor seal is applied to the signal which is a function of the pressure differential across the second sensor seal as a feedback signal to compensate for cross-sectional area variations in the Bourdon tube of the second pressure differential sensor.

4. In a transducer for measuring the flow rate of a fluid, the combination of
  a pressure differential sensor comprised by a helically configured Bourdon tube having a pressure inlet at each end thereof and a seal in the tube disposed equidistant from said inlets and dividing each tube into two separate pressure sensing portions;
  a linear variable differential transformer associated with the pressure sensor, said linear variable differential transformer including a transformer core, a transformer input circuit and a transformer output circuit;
  means for connecting said pressure sensor at the seal to the core of said transformer so that movement of the seal moves the core of the transformer;
  first fluid pressure inlet means;
  means for connecting said first fluid pressure inlet means to one pressure inlet of said pressure sensor for communicating the pressure at said first fluid inlet means to said sensor;
  second fluid pressure inlet means for receiving a reduced pressure from a flow measuring device of the class comprised by orifices and venturis through which the flow to be measured flows;
  means for connecting said second pressure inlet means to the other pressure inlet of the pressure transducer to communicate the pressure of said second pressure inlet means to said other sensor pressure inlet, whereby the position of the sensor transformer core is a function of the pressure differential across the sensor seal representing the pressure drop generated by the flow measuring device;
  transformer actuation means operable to energize the transformer input circuits to produce a transformer output signal in the transformer output circuit, said output signal being a function of the position of the core and therefore of the pressure differential across the seal;
  computation means operable in response to the output signal transformer output circuit to compute flow rate; and
  means for applying the signal transformer output circuit to the computation means, in which the flow rate computation is based upon the equation:

$$Q_i = K_3 [\Delta P]^{1/2}$$

when
  $Q_i$ is the flow rate by weight or volume,
  $\Delta P$ is the pressure differential across the sensor seal, and
  $K_3$ is a constant for the device.

* * * * *